March 3, 1959   J. G. COOPER   2,875,943
CARTONS
Filed Feb. 13, 1952
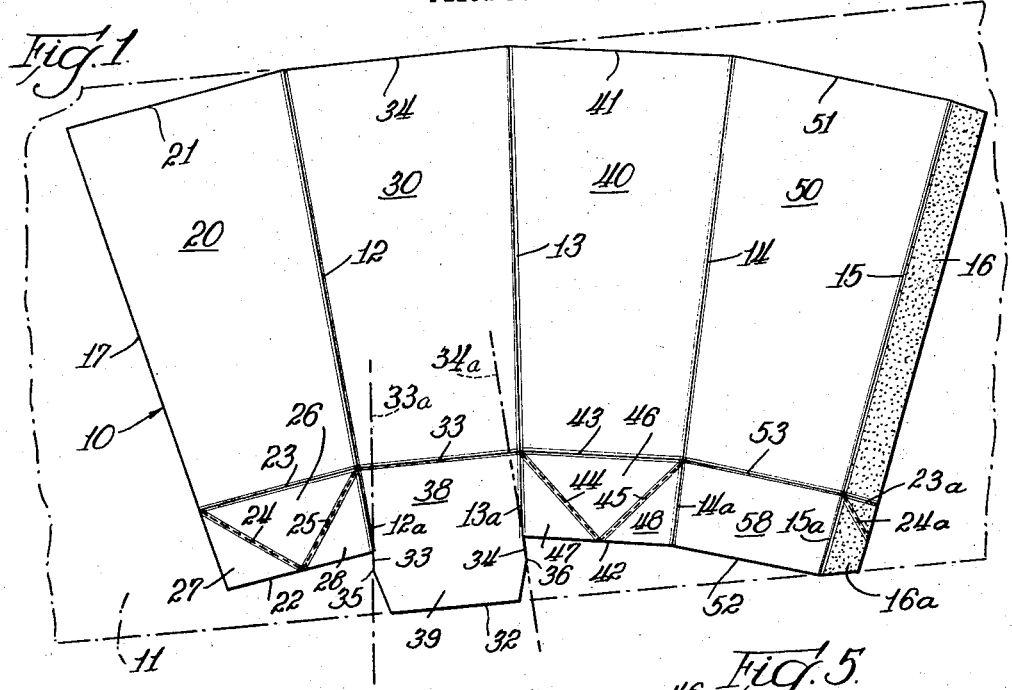
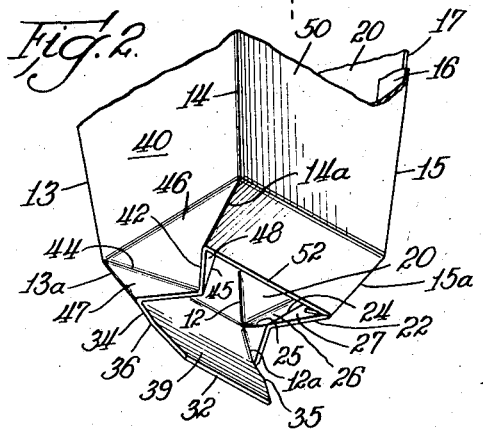
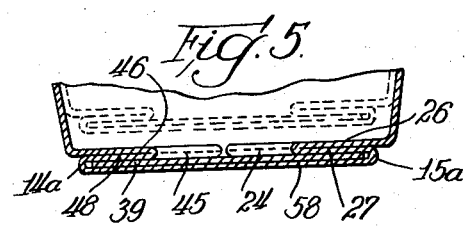
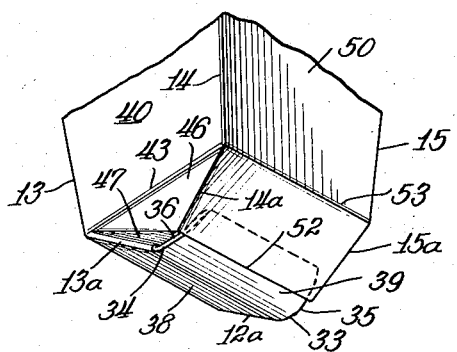
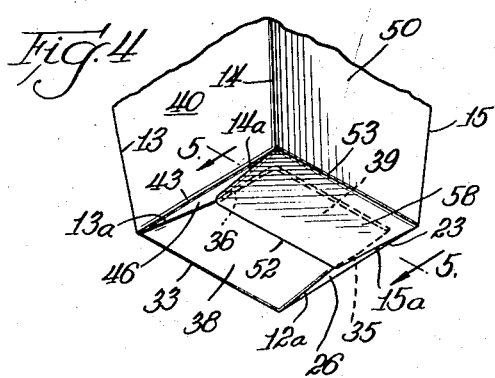
INVENTOR.
John G. Cooper
BY
Atty.

United States Patent Office 2,875,943
Patented Mar. 3, 1959

2,875,943

CARTONS

John G. Cooper, Evanston, Ill.

Application February 13, 1952, Serial No. 271,298

3 Claims. (Cl. 229—39)

The present invention relates to cartons generally and more particularly to an open top disposable carton made preferably of chip board for "one time" use in dispensing confections or the like, especially those served with a granulated seasoning or liquid flavoring such as pop corn.

The problem of dispensing pop corn is chosen for purpose of illustrating the invention, without it necessarily being limited thereto, because pop corn is served with salt, or butter, or both, and the difficulties encountered with salt and butter are typical or difficulties encountered with many confections consumed in gatherings of people in theaters as well as elsewhere.

As a general rule, unseasoned pop corn is popped and kept fresh and hot either in the popping machine or a so-called pop corn warmer, to be placed in a carton or box only at the time of purchase. When sold, the carton is filled with pop corn, salt is shaken on to trickle down through the pop corn if not added during popping and, if the customer desires, melted butter or other seasoning is poured on the top of the pop corn to drain downwardly through the pop corn. Ultimately, as the pop corn is eaten, the salt and melted butter in substantial quantities accumulate at the bottom of the carton.

With conventional pop corn cartons or boxes the folded bottom has many openings and slits in it through which the salt escapes to fall upon the lap of the person holding the carton. Through these same openings and slits the melted butter can drain upon and soil the clothing of the customer. Even in some instances where there is no draining, the bottom of the box becomes so saturated with butter that contact between the carton and clothing of the customer causes spotting of the clothing.

Moreover, the confectioner selling the pop corn has several long standing problems with cartons of conventional construction. More often than not the pop corn is dispensed in stores where space is at a premium. The cartons have to be stored in their unfolded condition until a purchaser asks for one. At that time the confectioner must take the time to fold the carton before filling it with pop corn. This takes selling time. Of course, the confectioner can fold several boxes at a time and fill them with pop corn and leave them in the pop corn stand where pop corn is kept hot. But this is not satisfactory because purchasers like to see fresh pop corn go into the carton they buy. Besides this, popped corn stored in a carton is out of continuous contact with the warm dry air that keeps it hot and fresh.

Efforts have been made to overcome the "made-up" carton storage problem by providing cartons which can be nested after they are folded. However, these cartons employ bottom flaps which engage and bind against the sides of the carton in which they are nested. Then when the nested carton is withdrawn for use either the flaps of the withdrawn carton are pulled open or loosened sufficiently that the confectioner must take further time to make sure that the bottom is secure, or two or three cartons are pulled out with the withdrawn carton and have to be separated. The confectioner finds that it takes almost as much time to be sure that the bottoms of the nested cartons are secured as it does to fold the carton initially from a flat carton at the time of a sale.

The present invention obviates these difficulties and provides a container from which salt and butter will not drip under normally expected use, yet is easily folded by a confectioner and can be stored in large numbers in nested relationship for rush trade without danger of the bottoms becoming loosened.

The invention is further characterized by an open mouthed carton of tapering form with a bellows type closure whose side fold lines in the blank form are straight continuations of the fold lines of the side panels of the carton.

The invention is further characterized by a construction in which a bellows type bottom flange is folded into a shape which tapers so that the folded edges come well within the perimeter of the bottom of the carton.

One of the objects of the invention is to provide a folded carton having an improved locking relationship holding the folded portions flat and secure under all normally expected uses.

A further object of the invention is to provide a folded closure for the bottom of a pop corn carton which absorbs excess butter and prevents it from soiling the clothing of a customer holding the container.

The invention is further characterized by a bottom construction which supports the carton squarely against tipping yet does not reduce the contents of the carton.

A further object of the invention is to provide a pop corn dispensing carton which can be unfolded and returned to its flattened form without any damage thereto in event the confectioner has folded too many of them at one time.

A further object of the invention is to provide a device of the class described which is simple in its construction, easy to manufacture in mass production at high speeds, and readily foldable by a user in a self-indicating way to assist those unskilled mechanically.

These being among the objects of the invention, other and further objects will become apparent from the drawings, the description relating thereto, and the appended claims.

In the drawing:

Fig. 1 is a plan view of a blank from which the preferred carton or box may be formed;

Fig. 2 is a fragmentary perspective view of the bottom of the carton as the bottom appears in the initial stages of folding;

Fig. 3 is a view similar to Fig. 2 showing an advanced stage of the bottom folding procedure;

Fig. 4 is a view similar to Fig. 2 with the bottom completely folded and locked; and Fig. 5 is a section taken up on the line 5—5 of Fig. 4.

The invention in its preferred embodiment contemplates a carton or box in the ultimate shape of a frustum of a pyramid, open at the wide end and closed at the small end for nesting purposes and ease of filling. The bottom closure elements constitute a part of or are extensions set off from the side panel element of the carton by a fold line and are joined integrally with each other along side fold lines which are straight line continuations of the edges of the side panel elements. Thus the side fold lines of the bottom closure elements are non-parallel and converging.

Two extensions are scored with perforations along predetermined lines running from the bottom corners of the carton to provide bellows-like folds. One of the other extensions has a flap whose sides are cut along parallel or slightly diverging lines for a short distance to be received and locked between opposing bellows folds under the edge of the extension opposite the flap extension.

Referring now to the drawing in further detail, the blank is indicated generally by the numeral 10 as cut from a sheet or web 11 indicated in broken lines. Four equally spaced upwardly diverging fold lines 12, 13, 14, and 15 divide the blank into four panels 20, 30, 40, and 50, and a gluing strip 16. Panels 20 40, and 50 are identical in shape and size, while panel 30 differs therefrom in that it is longer at the bottom to provide a tuck or flap 39. The panels define isosceles trapezoids and when glued and folded with respect to each other about fold lines 12, 13, 14, and 15 the resulting shape is a frustrum of a pyramid except for the flap 39 which extends beyond the plane of the frustrum.

The upper edges of the two parallel sides of each panel are indicated at 21, 31, 41, and 51, respectively, and the bottom edges of the parallel sides of each panel is indicated at 22, 32, 42, and 52, respectively. At a distance of about one half the length of the side 22 the panels are scored along lines 23, 33, 43, and 53 respectively, along lines parallel to the respective edges 22, 32, 42, and 52. In this connection the gluing flap 16 is provided with structure identical with that of panel 20 to the extent that 16 overlaps the panel 20.

The two panels 20 and 40 contiguous to the panel 30 having the flap 39 on it, are scored to fold upon themselves like bellows. For instance, in panel 20, score lines 24 and 25 are disposed at right angles to each other and run from the ends of the fold line 23 to the mid-point of the edge 22 where they intersect. A corresponding arrangement in panel 40 is provided in that the score lines 44 and 45 are disposed at right angles to each other and run from the ends of the fold lines 43 to the mid-point of the side 42 where they intersect. These score lines identified by the numerals 24, 25, 44, and 45, preferably include interrupted slits or perforations through the blank so that the blank is materially weakened along these lines and will give and fold quickly along the lines when lateral displacement pressures are applied thereto.

The triangular space defined by the score lines 23, 24, and 25 is hereinafter referred to as the bottom portion 26 and, likewise, the triangular panel space in panel 40 is hereinafter referred to as the bottom portion 46. The section between the edge 22 and the score line 24 is identified by the numeral 27 and the section between the edge 22 and the score line 25 is identified by the numeral 28. Correspondingly, the section between the edge 42 and the score line 44 of the panel 40 is identified by the numeral 47, and the section between the edge 42 and the score line 45 is identified by the numeral 48. Moreover, for a clearer explanation of the invention the fold lines 12, 13, 14, and 15, where they extend below the fold lines 23, 33, 43, and 53 are portions identified by the suffix "a."

The side edges of flap 39 for a short distance below the adjacent edges 22 and 42 preferably are parallel with each other for a short distance as indicated at 33 and 34. If there is any variation from parallesim, it is preferred that they diverge slightly as indicated by broken lines 33a and 34a in a direction away from the fold line 33 of the flap 39, or as viewed in Fig. 1 of the drawing in a downward direction towards its free end edge 32 so that the points indicated at 35 and 36 are spaced a distance from each other equal to or greater than the length of the edge 52 between the fold lines 14a and 15a. Beyond the points 35 and 36 the flap 39 tapers sharply to the edge 32.

Once a blank is cut, glue is applied to the flap 16, the panel 50 is folded along the line 14—14a back against the panel 40, and the panel 20 is folded along the fold 12 back to back against the panel 30, in which position of the panels 50 and 20 the panel 20 overlaps the glue flap 16 and is adhered thereto with a suitable adhesive. The blank thus formed may be referred to as a carton, and in the form thus far described is packed and shipped to the users.

In the hands of the user the panels are moved away from each other and the blank flexed about the fold lines 13 and 15 to square the panels with each other. Thereafter the cartoon is inverted to rest on its top edges 21, 31, 41, and 51, in which position they are now coplanar, and the user applies finger pressure against the bottom portions 26 and 46 to force them inwardly towards each other. Under this force these portions begin to fold along the lines 23 and 43, respectively, and as they are forced further towards each other they also will fold about the perforated scored lines 24 and 25 and 44 and 55, respectively, as more particularly shown in Fig. 2 to draw the bottom portions 38 and 58 towards each other.

This is a progressive procedure and when the edge 52 begins to approach close enough to the edge 32 of the flap 39 the edge 32 is pressed downwardly to pass under the edge 52. Thus the flap 39 as shown in Fig. 3 is progressively inserted deeper and deeper between the bottom portion 58 of the panel 50 and the sections 48 and 27 until the points 35 and 36 upon the flap 39 are about to enter the folds 14a and 15a.

In this position it will be noted that the folding at the lines 14a and 15a has not advanced to the stage where there is face-to-face contact between these sections 48 and 58 upon one side and 27 and 58 upon the other side. There still is substantial space between them and since the fold is not completely closed it is free to yield sufficiently to let the points 36 and 35 pass the edge 52 without undue strain upon the fold lines 14a and 15a at that time.

Thereafter the user applies pressure against the section 38 and the portion of the flap 39 remaining outside the edge 52, and simultaneously with the deeper insertion of the flap 39 which follows, the folds 14a and 15a begin to close more tightly behind the points 35 and 36, until the flap 39 is pressed completely home as shown in Fig. 4. This is significant because it will be noted that the folds 14a and 15a lie on lines converging in the direction of the edge 52 in a manner whereby there is greater width for the flap 39 across its expanse between points 35 and 36 the deeper it is received between the folds 14a and 15a. Furthermore the folds 14a and 15a and the edge 52 tighten as they close against the edges 34 and 33 of flap 39 behind the points 35 and 36 with a tightening gripping action to lock the flap 39 in secure position when it is pressed fully home. This relationship is also shown in Fig. 5.

In this connection it is interesting to note that the weakened condition provided for by the scored interrupted slitting along the lines 45, 25, 44, and 24 permits the portions 27 and 28 to come to rest in face-to-face contact with the bottom portion 26 and the portions 47 and 48 to come into face-to-face contact with the bottom portion 46 in a way which provides what may be called an over-center toggle lock which prevents outward movement of the portions 38 and 58 once the lock is established behind the points 35 and 36 of the flap 39.

In addition to the locking action shown in Fig. 4 it will be noted that the fold edges 13a and 14a are located a substantial distance inwardly from the fold 43, thus being well within the perimeter of the bottom of the box. This is also true of the folds 12a and 15a with respect to the fold line 23. As a consequence of this construction the edges 12a, 13a, 14a, and 15a are located remote from the plane of the panels 20 and 40 and for that reason would not come into contact with any wall into which the carton would telescope in nested relationship. Thus, as shown in Fig. 5 it will be seen how a carton nested in another carton would not encounter a binding relationship between the bottom of the one carton and the side walls of the other carton. Therefore, the locked bottom of the nested carton will not be loosened when the nested carton is removed from its nesting position. This is not true with cartons where the bottom flaps are coextensive with the bottom edges of the carton.

Furthermore, it will be observed in Figs. 4 and 5 how the fold lines 12a, 13a, 14a, and 15a serve as rigid elements to keep the bottom perfectly flat so that the container when set upon a table is perfectly stable. Not only does the lock which is established by the points 35 and 36 tend to keep the fold lines in a common plane but the stock itself of the flap 39 serves also as a rigidifying effect. In addition to this the triangular portions 26 and 46 when forced slightly beyond a flat position at the time flap 39 is inserted in place also have a beam-like supporting effect to prevent downward movement of the bottom except when a person intentionally inserts an instrument under the edges 12a, 13a, 14a, and 15a to lift them and release the locking relationship.

From the description thus far, it will be seen how any melted butter draining down to the bottom of the container must follow a circuitous path in order to get outside of the bottom. Furthermore, whenever there is any chance for melted butter to get outside of the container, it has to pass over a wide area where two thicknesses of chip board are in face-to-face contact and before the melted butter could get very far it would be absorbed into the stock behind the contacting faces. Moreover it is impossible for granulated seasoning such as salt to find its way through the bottom of the box.

With this double thickness of stock in the bottom of a container there is very little likelihood that melted butter in reasonably used quantities would ever soak through enough to cause spots in clothing against which the container might come to rest inadvertently. The face-to-face contact of two layers of chip board would by capillary action prevent a saturation of butter at any one particular point. The capillary action would force the butter to absorption over a wide area and eliminate any saturation which would cause spotting of clothing and contact with the outside layer.

Although chip board is described in connection with the embodiment disclosed, other forms of paper such as, but not limited to, patent coated paperboard, or solid pulp board can be used to an advantage for the purposes described and also a grease proofing coating or laminations can be included if desired.

Consequently, it will be readily apparent to those skilled in the art how the objects and purposes of the invention are fulfilled with the embodiment disclosed and described herein and it will be readily apparent how various modifications and changes can be made in the construction without departing from the spirit of the invention the scope of which is commensurate with the appended claims.

What is claimed is:

1. An open topped carton comprising a blank having four contiguous panels defining like isosceles trapezoids, all of said panels being folded toward each other along coplanar fold lines positioned adjacent the narrow end of each panel and spaced from the edge of the narrow end of at least one of the panels a distance approximately one-half the length of the said narrow end edge of the panel to define fold elements on two oppositely disposed panel to define fold elements on two oppositely disposed panels, one of said oppositely disposed panels being longer at its fold element than the other to provide a flap, the side edges of said flap extending along diverging lines in a direction towards the free end edge of the flap over a portion of their length immediately beyond the ends of adjacent panels, the said adjacent panels having diagonal score lines extending from their narrow end edges to the ends of their respective fold lines and each being folded upon itself at the diagonal score lines in a bellows type fold to define fold edges along said fold elements that converge in a direction toward the free edges of said fold elements respectively, said flap along its diverging edges being received at the free edge of the other fold element beneath the fold element and frictionally between said fold edges, said diverging edges being spaced from each other a distance substantially equal to the length of said free edge of said other fold element where the flap coincides therewith at said narrow end edge, said converging fold edges gripping said diverging edges in a locking engagement therewith adjacent said free edge of said other fold element.

2. A folded blank carton having four like isosceles trapezoid panels which are separated into sides and bottom portions by fold lines constituting a single continuous fold line adjacent the narrow bottom edge of the panels and spaced from the narrow bottom edge of at least one of the panels a distance approximately one-half the length of the said narrow bottom edge of the panel, one of said panels extending beyond the others to provide a flap and the two panels on opposite sides of said one panel having diagonal score lines extending from the ends of each of their fold lines and terminating in the narrow bottom edges of the respective panels, said flap having side edges over a portion of its length that are non-converging in the direction of its bottom edge and spaced from each other at the bottom edges of said two panels a distance equal to the length of the narrow bottom edge of the panel opposite said one panel to rest under the narrow bottom edge of said opposite panel in a frictionally locked relationship between the adjacent panels, said adjacent panels being folded against said opposite edge along non-parallel lines, the non-parallel folds gripping said non-converging side edges tightly to form a lock therewith.

3. A carton blank comprising a plurality of panels separated by fold lines, two of the panels defining like isosceles trapezoids spaced from each other by an intermediate panel, one of said two panels being divided into a side and a tapering bottom by a single fold line positioned adjacent the narrow end of the panel and spaced from the narrow end of the trapezoid panel a distance approximately one-half of the length of the said narrow end edge of the panel, the side edges of said bottom being defined by fold lines converging from said single fold line, and a flap on the other one of the two panels at its narrow end having side edges extending along diverging lines towards its end edge at a distance spaced therefrom, said flap having a width between its side edges at a predetermined distance from its end edge that is equal to the length of the narrow end of said tapering bottom.

References Cited in the file of this patent

UNITED STATES PATENTS

| | | |
|---|---|---|
| 681,323 | Houghland | Aug. 27, 1901 |
| 1,735,682 | Hess | Nov. 12, 1929 |
| 1,808,772 | Ethridge | June 9, 1931 |
| 1,924,529 | Wellman | Aug. 29, 1933 |
| 2,398,797 | Meyer et al. | Apr. 23, 1946 |
| 2,412,666 | Zinn | Dec. 17, 1946 |
| 2,461,251 | Ball et al. | Feb. 8, 1949 |

FOREIGN PATENTS

| | | |
|---|---|---|
| 8,957 | Australia | Aug. 29, 1932 |
| 657,034 | Great Britain | Sept. 12, 1951 |